Aug. 20, 1957    KARL-GUSTAV LUNDH    2,803,042
APPARATUS FOR EXTRUDING TUBES OF FIBROUS MATERIAL
Filed July 30, 1954
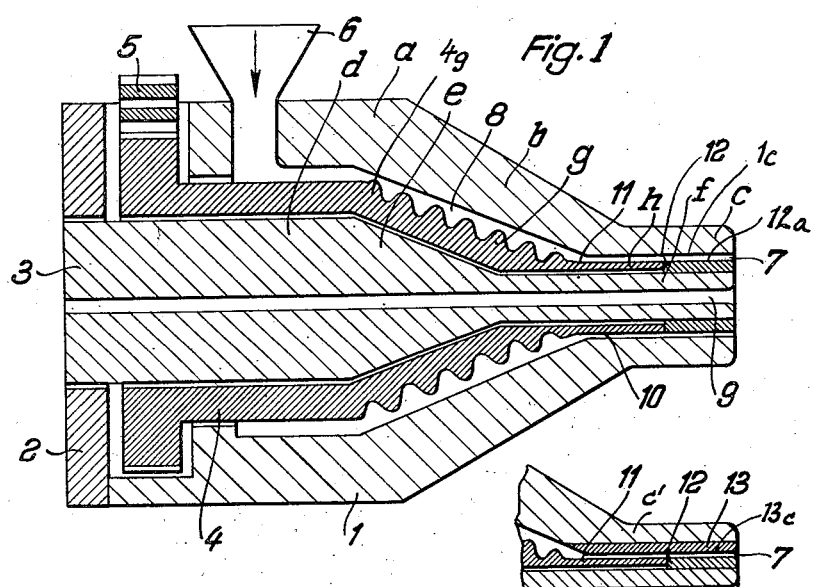
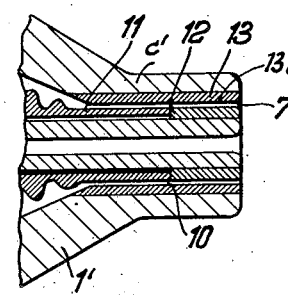
Inventor:
Karl-Gustav Lundh

2,803,042
APPARATUS FOR EXTRUDING TUBES OF FIBROUS MATERIAL

Karl-Gustav Lundh, Vaduz, Liechtenstein, assignor to Anstalt Unda, Vaduz, Liechtenstein Application July 30, 1954, Serial No. 446,849

Claims priority, application Switzerland August 3, 1953

2 Claims. (Cl. 18—14)

The present invention relates to an extrusion apparatus, and more particularly to an extrusion apparatus for fibrous material of animal origin used in the manufacture of sausage casings.

It is known to produce artificial sausage casing by extruding a fibrous moldable material of animal origin, preferably consisting of animal skin tissue, through an annular extrusion nozzle. It is also known to supply the fibrous material before extrusion to a conical annular space and to move the fibrous material by a worm means through the conical annular space to an annular extrusion nozzle whereby the material is mixed and part of the fibers is displaced to assume a transverse position with respect to the extrusion direction.

It is one object of the present invention to improve the known apparatus for extruding sausage casings and to produce a sausage casing in which the fibers cross each other.

It is another object of the present invention to provide an apparatus for extruding sausage casings according to which one surface of the extrusion channel is rotated relative to the other surface of the extrusion channel so as to move the fibers in transverse direction into an intercrossing position.

It is a further object of the present invention to move the fibrous material by worm means through a conical space to an annular extrusion channel, one surface of which rotates for placing the fibers in an intercrossing position.

It is an important object of the present invention to extrude the fibrous material through an extrusion channel composed of a first portion having a rotating surface and a second portion constituting a fixed annular extrusion nozzle.

With these objects in view the present invention mainly consists in an extrusion apparatus which comprises, in combination, an outer member having an inner surface of revolution; an inner member having an outer surface of revolution, the inner member being arranged within the outer member with the surfaces of revolution facing each other defining an annular extrusion channel; means for extruding material through the annular extrusion channel; and means for rotating at least one of the members relative to the other of the members whereby parts of the material extruded through the annular extrusion channel are transversely moved by the surface of revolution of the one member during extrusion and interconnected with other parts of the material.

A preferred embodiment of the present invention is an extrusion apparatus for producing tubular sausage casings from a fibrous material of animal origin, the apparatus comprising, in combination, a tubular inner member having an outer conical surface and an outer cylindrical surface merging into said conical surface at the smaller end of the same; a supporting core member passing through the tubular inner member and turnably supporting the same, the supporting core member having an end portion projecting out of the inner tubular member adjacent the cylindrical surface; a ring secured to the projecting end portion of the core member and having an outer cylindrical face coaxial with and having the same diameter as the outer cylindrical surface of the inner tubular member and forming a continuation of the same; an outer tubular member fixedly connected to the supporting core member and enveloping the inner tubular member, the outer tubular member having a conical inner surface located opposite the conical outer surface of the tubular inner member, and a cylindrical inner face merging into the smaller end of the conical inner surface, the cylindrical inner face having a diameter greater than the diameter of the outer cylindrical surface and of the outer cylindrical face and extending in axial direction over the outer cylindrical surface and over the outer cylindrical face so as to define with the same an annular extrusion channel; worm means on the outer conical surface of the inner tubular member; and means for rotating the inner tubular member on the supporting core relative to the outer tubular member and to the ring so that the outer cylindrical surface of the inner tubular member transversely moves fibers of fibrous material extruded through the extrusion channel by the worm means into a position intercrossing with other fibers.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

Fig. 1 is an axial sectional view of a preferred embodiment of the present invention; and Fig. 2 is a fragmentary sectional view of a detail of a modified embodiment of the present invention.

Referring now to the drawing and more particularly to Fig. 1, in an outer tubular member 1 which consists of a cylindrical portion $a$, a conical portion $b$, and a cylindrical end portion $c$, an inner tubular member 4 is arranged which has an integral gear portion 5. The inner tubular member 4 has a conical portion $g$ and a cylindrical end portion $h$.

A supporting core member 3 which is provided with an axial bore 9 rotatably supports the inner tubular member 4 and is fixedly connected to the outer tubular member 1 by an annular disk 2. The supporting core member 3 consists of a cylindrical portion $d$, a conical portion $e$ and a cylindrical portion $f$ which has an end portion projecting out of the cylindrical end portion $h$ of the inner tubular member 4. A ring 12 is fixedly secured to the projecting end portion of the supporting core member 3 and has an outer cylindrical face 12$a$ which has the same diameter as the outer cylindrical surface 11 of the cylindrical end portion $h$ of the inner tubular member 4. The end portion $c$ of the outer tubular member 1 has an inner cylindrical surface 1$c$ which extends over the two cylindrical surface portions 11 and 12$a$ and defines with the same an annular extrusion channel 7, 10.

A worm means 4$g$ is arranged on the conical portion $g$ of the tubular inner member 4 in the space 8 which is bounded by the conical inner surface of the portion $b$ of the outer tubular member 1.

A hopper 6 is arranged above an inlet opening in the outer tubular member 1.

The extrusion apparatus operates in the following manner:

The material to be extruded, preferably a fibrous material of animal origin, is continuously supplied through the hopper 6 into the space between the outer and inner members 1 and 4. The inner member 4 is rotated by drive gear means, not shown, meshing with the gear 5, so that the worm means 4$g$ press the material into the extrusion channel defined by the cylindrical face 1$c$ and by the cylindrical surface composed of the cylindrical surface portions 11 and 12$a$. The fibrous material is mixed and partly rearranged in transverse direction while being moved by the worm means 4$g$.

When the material enters the annular extrusion channel portion 10 between the cylindrical surfaces 11 and 1c, the rotating cylindrical surface 11 engages part of the fibers and moves the same transversely and into a position intercrossing with other fibers, whereupon the material is extruded through the extrusion channel portion 7 between the surfaces 12a and 1c to form an extruded tube which is expanded by air blown through the axial bore 9.

The above description of the apparatus according to the present invention will make it apparent that outer and inner members 4 and 1 are provided with surfaces of revolution 11 and 1c which together form an extrusion channel, and that means 5 are provided for rotating the inner member 4. The worm means 4g constitute means for extruding the material through the extrusion channel. The ring 12, and the portion of the extension c opposite the ring 12 constitute a nozzle means having an annular extrusion passage 7 defined by the two cylindrical faces 12a and 1c.

Consequently, the material is pressed through an extrusion passage 7 having a movable surface 4h by which the material is transversely rearranged into an intercrossing position and then extruded through an annular fixed nozzle 7. This arrangement has the advantage that the extruded tubes are of uniform texture and offer high resistance against tensile forces.

It has been found that a material having particularly desirable properties is obtained when the axial extension of the rotating cylindrical surface 11 is substantially equal to its diameter.

According to the modified embodiment illustrated in Fig. 2, the end portion c' of the outer tubular member 1' is provided with a detachable annular member 13 whose inner surface 13c corresponds to the inner surface 1c of the embodiment shown in Fig. 1. By exchanging a detachable member 13, with other members 13 having a different inner diameter, it is possible to vary the width of the annular extrusion channel.

Consequently, the width of the annular extrusion passage can be adjusted by using different members 13. This is of importance since at a constant rotary speed, the fibers cross in a wider extrusion passage and in a narrower extrusion passage at different angles. By exchanging the detachable annular members 13, the angle at which the fibers cross in the extruded tube can be varied, as desired. Moreover, the wall thickness of the extruded tube may be varied by using annular members 13 having different inner diameters.

It will be understood that each of the elements described above, or two or more together, may also find a useful application in other types of extrusion apparatus differing from the types described above.

While the invention has been illustrated and described as embodied in an extrusion apparatus for manufacturing tubular sausage casings from fibrous material of animal origin by extruding the fibrous material through an annular extrusion passage composed of a first portion having a rotating surface and of a second stationary nozzle portion, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essenial characeristics of the generic or specific aspects of this invention and, therefore, such adaptations should and are intended to be comprehended within the meaning and range of equivalence of the following claims.

What is claimed as new and desired to be secured by Letters Patent is:

1. Extrusion apparatus for producing tubular sausage casings of a fibrous material of animal origin, comprising, in combination, a tubular inner member having an outer conical surface and an outer cylindrical surface merging into said conical surface at the smaller end of the same; a supporting core member passing through said tubular inner member and turnably supporting the same, said supporting core member having an end portion projecting out of said inner tubular member adjacent said cylindrical surface; a ring secured to said projecting end portion of said core member and having an outer cylindrical face coaxial with and having the same diameter as said outer cylindrical surface of said inner tubular member and forming a continuation of the same; an outer tubular member fixedly connected to said supporting core member and enveloping said inner tubular member, said outer tubular member having a conical inner surface located opposite said conical outer surface of said tubular inner member, and a cylindrical inner face merging into the smaller end of said conical inner surface, said cylindrical inner face having a diameter greater than the diameter of said outer cylindrical surface and of said outer cylindrical face and extending in axial direction over said outer cylindrical surface and over said outer cylindrical face so as to define with the same an annular extrusion channel; worm means on said outer conical surface of said inner tubular member; and means for rotating said inner tubular member so that said outer cylindrical surface of said inner tubular member transversely moves fibers of fibrous material extruded through said extrusion channel by said worm means into a position intercrossing with other fibers.

2. Extrusion apparatus for producing tubular sausage casings of a fibrous material of animal origin, comprising, in combination, a tubular inner member having an outer conical surface and an outer cylindrical surface merging into said conical surface at the smaller end of the same; a supporting core member passing through said tubular inner member and turnably supporting the same, said supporting core member having an end portion projecting out of said inner tubular member adjacent said cylindrical surface; a ring secured to said projecting end portion of said core member and having an outer cylindrical face coaxial with and having the same diameter as said outer cylindrical surface of said inner tubular member and forming a continuation of the same; an outer tubular member fixedly connected to said supporting core member and enveloping said inner tubular member, said outer tubular member having a conical inner surface located opposite said conical outer surface of said tubular inner member, and a tubular end portion extending in axial direction over said outer cylindrical surface and over said ring; a detachable annular member attached to said tubular end portion of said outer tubular member and having an inner cylindrical face merging into the smaller end of said conical inner surface of said outer tubular member, said inner cylindrical face having a diameter greater than the diameter of said outer cylindrical surface and of said outer cylindrical face and extending in axial direction over said outer cylindrical surface and over said outer cylindrical face so as to define with the same an annular extrusion channel; worm means on said outer conical surface of said inner tubular member; and means for rotating said inner tubular member so that said outer cylindrical surface of said inner tubular member transversely moves fibers of fibrous material extruded through said extrusion channel by said worm means into a position intercrossing with other fibers.

References Cited in the file of this patent

UNITED STATES PATENTS

| | | |
|---|---|---|
| 2,337,775 | Schultz | Dec. 28, 1943 |
| 2,461,856 | Tornberg | Feb. 15, 1949 |
| 2,676,356 | Becker | Apr. 27, 1954 |